United States Patent [19]

Jones

[11] 4,291,534
[45] Sep. 29, 1981

[54] SERVO BOOSTER ASSEMBLY

[75] Inventor: David Jones, Solihull, England

[73] Assignee: Lucas Industries Limited, Birmingham, England

[21] Appl. No.: 85,985

[22] Filed: Oct. 18, 1979

[30] Foreign Application Priority Data

Nov. 2, 1978 [GB] United Kingdom ............... 42909/78

[51] Int. Cl.³ ............................................. B60T 13/00
[52] U.S. Cl. ............................... 60/547 R; 91/216 A; 91/377; 92/166
[58] Field of Search ................. 91/216 R, 216 A, 217, 91/377; 92/165 PR, 117 R, 166; 60/547 R

[56] References Cited

U.S. PATENT DOCUMENTS

| | | | |
|---|---|---|---|
| 2,490,625 | 12/1949 | Hall | 91/217 |
| 2,770,223 | 11/1956 | Ayers, Jr. | 91/377 |
| 2,784,702 | 3/1957 | Ayers, Jr. | 91/377 |
| 3,145,628 | 8/1964 | Medley | 92/166 |
| 3,177,777 | 4/1965 | Kenrick | 91/217 |
| 3,321,915 | 5/1967 | Martin | 92/117 R |
| 3,352,315 | 11/1967 | Kellogg | 91/217 |
| 3,362,297 | 1/1968 | Cripe | 91/217 |
| 4,182,220 | 1/1980 | Fulmer | 91/217 |
| 4,183,215 | 1/1980 | Weber | 91/216 A |

Primary Examiner—Abraham Hershkovitz
Attorney, Agent, or Firm—Scrivener, Clarke, Scrivener and Johnson

[57] ABSTRACT

A servo booster assembly comprises a housing having a fixed part and a movable part defining a chamber therebetween, a control valve for communicating the chamber alternately with vacuum and ambient air, and an input member movement of which operates the control valve. In response to operation of the control valve the movable housing part moves relative to the fixed part between an inoperative position and an operative, brake-applying position, the movable part being connected to an output member. The housing parts are interconnected by a tie bar the ends of which extend outside the housing and are adapted respectively for connection to a master cylinder and a vehicle bulkhead.

4 Claims, 1 Drawing Figure

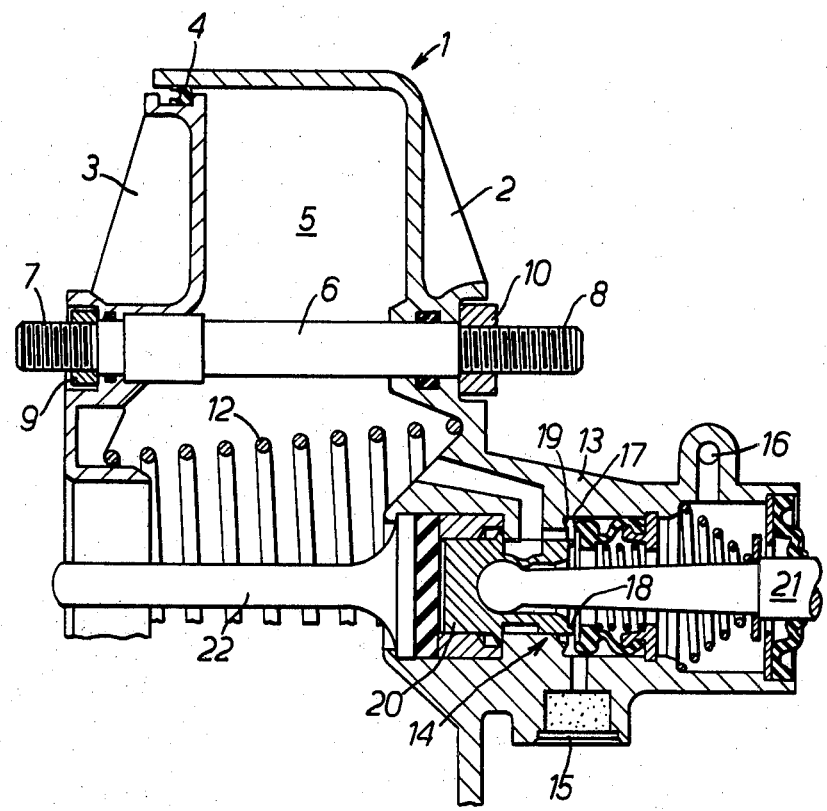

SERVO BOOSTER ASSEMBLY

This invention relates to servo booster assemblies for vehicle braking systems.

Such assemblies are known which comprise a housing having two opposed shells, and a movable wall dividing the interior of the housing into two chambers. In the inoperative condition, both chambers are interconnected through a first valve and are also connected to a vacuum. Upon operation of the assembly, movement of an input member closes said first valve to isolate the chambers from each other and opens a second valve which communicates one chamber with ambient atmosphere. The pressure differential across the movable wall, which is usually in the form of a supported diaphragm, moves the movable wall which transmits a boost force to an output member connected to a master cylinder piston.

The shells of the housing are fixed, one shell being connected in use to the vehicle bulkhead and the other shell, through which the output member extends, being connected to the master cylinder housing.

The present invention aims to enable the cost, overall length and weight of such a servo booster assembly to be reduced.

In accordance with the present invention, there is provided a servo booster assembly comprising a housing having two parts defining a chamber therebetween, control valve means for communicating the chamber alternat with vacuum and ambient air, and an input member movement of which operates said control valve means, wherein one of the housing parts is movable relative to the other part between an inoperative position and an operative, brake-applying position in response to operation of said control valve means and is connected to an output member.

The booster assembly according to the invention does not require the internal movable wall of the known assemblies referred to above with the result that the overall length of the assembly can be reduced, thereby saving space in the vehicle engine compartment, that the assembly can be lighter since the weight of the movable wall is dispensed with, and that the cost of production and assembly of the movable wall can be saved.

Preferably, said one housing part is slidably and sealingly mounted on a force-transmitting tie bar which extends between said parts and the ends of which are respectively adapted for connection to a master cylinder housing and the vehicle bulkhead. The tie bar in use transmits reaction forces from the master cylinder housing to the bulkhead to permit the booster assembly housing to be made from relatively thin, lightweight and cheap material, such as plastics.

The control valve means is preferably so operable that movement of said input member towards the operative position first closes communication between said chamber and ambient atmosphere and then opens communication between said chamber and vacuum.

A servo booster assembly for a vehicle braking system will now be described, by way of example, with reference to the accompanying drawing which is an axial cross-section of part of the booster assembly.

The booster assembly has a housing 1 comprising a movable part 2 and a fixed part 3 between which is a seal 4, the parts 2, 3 defining a sealed chamber 5 therebetween. One or more tie bars 6 extend between the housing parts, the ends 7, 8 of each tie bar protruding beyond the housing parts for attachment respectively to a master cylinder housing and a vehicle bulkhead or toeboard. The fixed part 3 is attached to each tie bar by a nut 9 and the movable part 2 is sealingly slidable on each tie bar 6, rearward movement being limited by a nut 10. The movable part 2 is biased towards its illustrated inoperative position by a coil compression return spring 12.

The movable housing part 2 has a hollow central boss 13 housing a control valve arrangement 14 which controls communication of the chamber 5 on the one hand with an air inlet 15 open to ambient atmosphere or on the other hand with a vacuum inlet 16. The valve arrangement 14 comprises an expansible valve member having a seat 17 biased towards two annular valve parts 18, 19. One of the valve parts 18 is formed on a member 20 which is connected to an input member in the form of a push rod 21, engagement of the valve part 18 with the seat 17, as illustrated, closing off communication of the chamber 5 with the vacuum inlet 16, but permitting communication with the air inlet 15 the other valve part 19 is fixed and formed in the boss 13 and engagement of that part 19 with the seat 17 closes communication of the chamber 5 with the air inlet 15.

In operation, when the brakes are applied, the push rod 21 moves to the left moving the member 20 until the valve seat 17 engages the fixed valve part 19 to close off communication between chamber 5 and the ambient air inlet 15. Further movement of the push rod moves valve part 18 away from the seat 17 to apply a vacuum to the chamber 5, the housing part 2 moving leftwardly due to the pressure differential across the housing part. Such movement imparts a thrust on an output member 22 which is coupled with the housing part 2.

Reduction of the input force closes the vacuum valve 17, 18 and opens the air valve 17, 19 to increase the air pressure in chamber 5 and reduce the output force applied to the output member 22 the thrust applied to the output member 27 is directly related to the force applied to the push rod 21.

Although described above with the rear housing part 2 movable, it will be appreciated that the booster assembly could be so designed that the rear part could be fixed and the front part 3 allowed to move.

The above-described booster assembly has the following advantages over known assemblies having an internal movable wall:

(a) that a relatively short installation length is required,
(b) that a greater efficiency is attained because the return spring 12 does not need to overcome forces due to pressure differentials across the movable wall,
(c) that there are only small deflections of the housing 1 since reaction forces are transmitted through the tie bars
(d) that the assembly is relatively lightweight since the interior wall is dispensed with,
(e) that the full area of the movable housing part 2 is used to provide the booster output thrust, and
(f) that production and assembly costs are lower.

Although in the assembly described above the fixed booster part 3, and consequently in use the master cylinder, is supported by one or more tie bars 6 extending internally through the booster, the tie bars transferring forces to the vehicle bulkhead, other means of support could be provided for the fixed part. For example, one or more support brackets attached to the fixed part and extending externally of the booster could be provided, the or each bracket being bolted or otherwise secured in use to the vehicle bulkhead.

I claim:

1. A brake servo-booster assembly for attachment to a mounting means of a vehicle, comprising a housing having first and second housing parts having inner surfaces defining a chamber there between, control valve means for communicating the chamber alternately with vacuum and ambient air, an input member operatively connected to said first housing part, and movable to operate said control valve means, said first housing part being movable relative to the said second housing part between an inoperative position and an operative, brake-applying position in response to operation of said control valve means and being connected to an output member, said first housing part having an outer surface on the side thereof remote from said chamber which is at all times exposed to ambient air, and wherein said second housing part has connecting means for rigidly attaching said second part to said mounting means, said connecting means including tie means comprising at least one force-transmitting tie bar which extends between said housing parts, said first housing part being slidably and sealingly mounted on said at least one tie bar, one end of said at least one tie bar having means for connection to a master cylinder housing, the other end of said at least one tie bar having means for connection to said mounting means.

2. An assembly according to claim 1, wherein said one end of said at least one tie bar is rigidly secured to said second housing part and said other end has a stop which limits movement of said first housing part away from said second housing part.

3. An assembly according to claim 1, wherein said control valve means is operable so that movement of said input member towards said operative position first closes communication between said chamber and ambient atmosphere and then opens communication between said chamber and vacuum.

4. An assembly according to claim 1, wherein said second housing part also has an outer surface which is exposed to ambient air and which with the outer surface of said first part defines the outer surface of said housing.

* * * * *